United States Patent
Mittal

(10) Patent No.: US 11,451,864 B2
(45) Date of Patent: Sep. 20, 2022

(54) DYNAMICALLY ADAPTIVE BITRATE STREAMING

(71) Applicant: V-NOVA INTERNATIONAL LIMITED, Greater London (GB)

(72) Inventor: Gaurav Mittal, Greater London (GB)

(73) Assignee: V-NOVA INTERNATIONAL LIMITED

(*) Notice: Subject to any disclaimer, the term of this patent is extended or adjusted under 35 U.S.C. 154(b) by 0 days.

(21) Appl. No.: 16/077,828

(22) PCT Filed: Mar. 8, 2016

(86) PCT No.: PCT/GB2016/050632
§ 371 (c)(1),
(2) Date: Aug. 14, 2018

(87) PCT Pub. No.: WO2017/141001
PCT Pub. Date: Aug. 24, 2017

(65) Prior Publication Data
US 2020/0128293 A1     Apr. 23, 2020

(30) Foreign Application Priority Data
Feb. 15, 2016 (GB) .................................. 1602667

(51) Int. Cl.
*H04N 21/44* (2011.01)
*H04N 21/2662* (2011.01)
(Continued)

(52) U.S. Cl.
CPC ... *H04N 21/44004* (2013.01); *H04N 21/2662* (2013.01); *H04N 21/434* (2013.01);
(Continued)

(58) Field of Classification Search
CPC ......... H04N 21/44004; H04N 21/2662; H04N 21/434; H04N 21/47217; H04N 21/643; H04N 21/845
(Continued)

(56) References Cited

U.S. PATENT DOCUMENTS 9,172,737 B2 * 10/2015 Panwar ................... H04L 65/80
9,537,917 B2 * 1/2017 Ramamurthy ..... H04N 21/6581
(Continued)

FOREIGN PATENT DOCUMENTS

EP        2360923      8/2011

OTHER PUBLICATIONS

Search report PCT/GB2016/050632 dated Oct. 13, 2016.
(Continued)

*Primary Examiner* — Nnenna N Ekpo
(74) *Attorney, Agent, or Firm* — Workman Nydegger

(57) ABSTRACT

A method of buffering, at a decoder, a segment (320') of an encoded data stream (300'), the segment (320') being arranged in hierarchical layers comprising a base layer segment (320-0) and an enhancement layer segment (320-1'), the base layer segment (320-0) being decodable to a base level of reproduction quality (LOQ#6), and the enhancement layer segment (320-1'), together with the base layer segment (320-0), being decodable to an enhanced level of reproduction quality (LOQ#1), the method comprising the steps of: receiving the encoded data stream (300') for a prescribed time period so as to buffer the base layer segment (320-0) and as much of the enhancement layer segment (320-1') as possible in the prescribed time period (P); and sending the buffered base layer segment (320-0) and what is received of the enhancement layer segment (320-1') to a decoder for decoding and output.

14 Claims, 10 Drawing Sheets

(51) Int. Cl.
  *H04N 21/434* (2011.01)
  *H04N 21/472* (2011.01)
  *H04N 21/643* (2011.01)
  *H04N 21/845* (2011.01)
(52) U.S. Cl.
  CPC ..... *H04N 21/47217* (2013.01); *H04N 21/643* (2013.01); *H04N 21/845* (2013.01)
(58) Field of Classification Search
  USPC .......................................................... 725/139
  See application file for complete search history.

(56) References Cited

U.S. PATENT DOCUMENTS

| | | | |
|---|---|---|---|
| 9,866,878 B2* | 1/2018 | van der Schaar | ............................ H04N 21/234327 |
| 2006/0023748 A1* | 2/2006 | Chandhok | ............... H04L 65/80 370/469 |
| 2007/0110163 A1 | 5/2007 | Kodama | |
| 2007/0153891 A1 | 7/2007 | Van Der Stok | |
| 2012/0005368 A1* | 1/2012 | Knittle | ............. H04N 21/23805 709/235 |
| 2012/0030723 A1* | 2/2012 | Baum | ............. H04N 21/234327 725/105 |
| 2014/0282792 A1 | 9/2014 | Bao | |
| 2016/0057467 A1* | 2/2016 | Yamagishi | ............ H04N 21/234 725/25 |
| 2017/0078735 A1* | 3/2017 | Greene | ............... H04N 21/6125 |
| 2020/0267429 A1* | 8/2020 | He | ...................... H04N 21/8456 |
| 2021/0021662 A1* | 1/2021 | Soroushian | .......... H04L 65/4069 |

OTHER PUBLICATIONS

Search Report GB 1602667.6 dated Jul. 27, 2018.
Cohen "Streaming fine-grained scalable ideo oer packet-based networks" Internet Citation Nov. 27, 2000.
H.264/MPEG-4 AVC Internet Citation (www.wikipedia.org).
Real Time Transport protocol Internet Citation (www.wikipedia.org).
Scalable Video Coding Internet Citation (www.wikipedia.org).
Qualcomm Incorporated "EMM-DDE Use Case—HTTP delivery of Partial Resou" 3GPP, mobile Component Center.
Volume SA WG4 Sep. 18, 2012 Internet Citation.

* cited by examiner

DYNAMICALLY ADAPTIVE BITRATE STREAMING

FIELD OF THE INVENTION

The invention broadly relates to the field of adaptive bitrate streaming, and in particular to a method of buffering, at a decoder or client device, encoded data in an encoded data stream. Particularly, but not exclusively, the invention relates to the adaptive bitrate decoding of encoded video data.

BACKGROUND OF THE INVENTION

Broadly speaking, adaptive bit rate streaming is a technique of determining, at a client device, the ability of the client device to receive and process an encoded video stream, and adapting the quality of the encoded video stream, in real time, to adjust the quality of the encoded video stream to suit an available bandwidth. The state-of-the-art in practical implementations of adaptive bitrate streaming includes Microsoft° Smooth Streaming (MSS), HTTP Live Streaming (HLS) and HTTP Dynamic Streaming.

These types of delivery are a combination of server and client software that detect a client's bandwidth capacity and adjust the quality of the video stream between multiple bitrates and/or resolutions. The adaptive bitrate video experience is superior to the delivery of a static video file from a streaming server at a single bitrate, because the encoded video stream can be switched midstream to suit the client's available network speed. When delivering static video files, there can sometimes exist excessive playback delay due to slow initial buffering speeds, or pauses in playback when the video stream cannot be downloaded quickly enough. Both of these problems are caused when the client's network bandwidth cannot deliver the video content at an optimal speed, and are especially pronounced in situations of variable network bandwidth. Furthermore, the delivery of the static video file may not utilise the full potential of the client device resulting in a sub-optimal video stream being used for presentation by the client device.

Microsoft® Smooth Streaming, HTTP Live Streaming, and HTTP Dynamic Streaming each use different protocols to receive video content, and so a client device must support each protocol. A standard for HTTP streaming of multimedia content has been developed, called MPEG-DASH, to enable consistent playback and unification of servers and clients of different vendors.

In general, in MPEG-DASH ("DASH"), multimedia content is captured and stored on an HTTP server and is delivered using HTTP. The content exists on the server in two parts: Media Presentation Description (MPD), which describes a configuration of the available content, its various encoded alternatives, their URL addresses, and other characteristics; and segments, which contain the encoded multimedia bit streams in the form of chunks, in single or multiple files.

To play the content, a DASH client first obtains the MPD. The MPD can be delivered using HTTP, email, thumb drive, broadcast, or other transports. By parsing the MPD, the DASH client learns about the program timing, media-content availability, media types, resolutions, minimum and maximum bandwidths, and the existence of various encoded alternatives of multimedia components, accessibility features and required digital rights management (DRM), media-component locations on the network, and other content characteristics. Using this information, the DASH client selects the appropriate encoded version of the content and starts streaming the content by fetching the segments using HTTP GET requests.

After appropriate buffering to allow for network throughput variations, the DASH client continues fetching subsequent segments and also monitors the network bandwidth fluctuations. Depending on its measurements, the DASH client decides how to adapt to the available bandwidth by fetching segments of different encoded alternatives of the content (with lower or higher bitrates) to maintain an adequate buffer.

However, despite adaptive bitrate streaming being a huge improvement over static video file streaming, and finding widespread practical use, there is room to improve adaptive bitrate streaming further. For example, there are still instances when video playback is disturbed or delayed due to unpredictable bandwidth fluctuations in fixed or mobile communications networks, for example when the available network bandwidth drops suddenly part way during the streaming of a segment, and the client presentation of video stalls before the client switches to a subsequent segment more suitable for the now available bandwidth. In such cases, adaptive bitrate streaming technology of the prior art may be improved to reduce disturbances or delays in video presentation in circumstances of varying bandwidth, thereby improving the user experience.

SUMMARY OF THE INVENTION

A first aspect of the invention provides a method of buffering, at a decoder, a segment of an encoded data stream, the segment being arranged in hierarchical layers comprising a base layer segment and an enhancement layer segment, the base layer segment being decodable to a base level of reproduction quality, and the enhancement layer segment, together with the base layer segment, being decodable to an enhanced level of reproduction quality. The method comprising the step of receiving the encoded data stream for a prescribed time period so as to buffer the base layer segment and as much of the enhancement layer segment as possible in the prescribed time period sending the buffered base layer segment and what is received of the enhancement layer segment to a decoder for decoding and output.

In this way, a more dynamic and adaptive streaming technique is achieved. For example, if required, the decoder is able to use only the base layer segment for decoding and presentation to a user, without using the enhancement layer segment, thus reducing initial buffering or viewing interruptions when the available bandwidth on the network fluctuates downwardly, especially but not exclusively during rapid downward fluctuations of bandwidth. Additionally, the hierarchical structure enables the decoder to use as much of the enhancement layer segment as received in the prescribed time period, without wasting the received enhancement layer segment information, and hence the bandwidth used to transmit that enhancement layer segment information. As a result, bandwidth is used more efficiently and an improved quality of video may be presented to a user. In particular, the bandwidth is used in a nearly optimal manner as nearly everything that is received by the decoder can be presented to the user. Also, when the network bandwidth fluctuates upwardly, the decoder may dynamically receive and use more enhancement layer segment information, thereby allowing for a quicker and more dynamic increase in the quality of output. As will now be apparent to the skilled reader, using a prescribed time period to buffer incoming segments of video, together with the use of a hierarchical video data structure in segments, has the ability to reduce disturbances or delays in video presentation in circumstances of varying bandwidth, thereby improving the user experience. Additionally, more dynamic and efficient use of bandwidth is achieved, thereby further improving the user experience.

In general, the present invention would allow to make more efficient and/or dynamic use of available bandwidth. Additionally, the present invention could provide the following advantages. First, it would allow to decrease the costs of encrypting and decrypting the overall content as only the base layer needs to be encrypted to protect the content (as further described in patent publication numbers WO 2013/011496 and U.S. Pat. No. 13/188,237 which are incorporated herein by reference). Second, it would allow reduction of the storage needed to store all the various video profiles as only incremental enhancements need to be stored. This would be particularly beneficial to a number of applications such as Cloud/Network Digital/Personal Video Recording (DVR/PVR). Thirdly, it would allow reduction of the power consumption for Content Delivery Network (CDN) and encoders as less encoding and less storage is required. Fourth, since the algorithm is agnostic of the underlying transport mechanism, the invention could be applied to any existing Adaptive Bit Rate techniques (e.g., Apple° HLS, MPEG DASH, etc.) and therefore can be flexibly deployed over existing and future services.

Optionally, the segment comprises a plurality of segment units of data, each segment unit of data having a corresponding base layer unit and a corresponding enhancement layer unit. Preferably, each base layer unit is decodable independently from other base layer units. Preferably, each enhancement layer unit is decodable with its corresponding base layer unit independently from other base layer units or other enhancement layer units.

Optionally, the encoded data stream represents media data. Preferably, the segment is a part-second or a multi-second part of the media data. Preferably, the segment comprises data representing a plurality of frames of video data, and each frame is represented by a base layer unit and an enhancement layer unit.

Optionally, the step of requesting the segment comprises requesting each of the base layer segment and the enhancement layer segment separately on a layer-by-layer basis. Preferably, in the step of requesting the segment comprises requesting firstly the base layer segment, followed by the enhancement layer segment.

Optionally, the step of streaming the encoded data stream comprises requesting firstly the segment of the encoded data stream, followed by requesting a second segment of the encoded data stream.

Optionally, the prescribed time is related to the amount of data in the segment. Preferably, the prescribed time is related to a playback time of the segment. Preferably, the prescribed time is less than the playback time of the segment.

Optionally, the reproduction quality is or is related to one or more of the following: resolution; compression; samples per second; or frames per second.

Optionally, the step of sending the buffered base layer segment occurs following, or at the end of, the prescribed time period.

There is also provided an apparatus for receiving and decoding an encoded data stream. The apparatus comprises: a processor configured to control streaming of an encoded data stream; a communications port configured to communicate with a source of the encoded data stream; and a buffer configured to buffer segments of the encoded data stream. Each segment of the encoded data stream is arranged in hierarchical layers comprising a base layer segment and an enhancement layer segment, the base layer segment being decodable to a base level of reproduction quality, and the enhancement layer segment, together with the base layer segment, being decodable to an enhanced level of reproduction quality. The processor is configured to receive the encoded data stream through the communications port for a prescribed time period so as to buffer the base layer segment and as much of the enhancement layer segment as possible in the buffer during the prescribed time period. The processor is configured to cause the buffered base layer segment and what is received of the enhancement layer segment to be sent from the buffer for decoding.

Optionally, the apparatus comprises a codec arranged to decode the buffered segments of the encoded data stream.

Optionally, the processor is further configured to cause the buffered base layer segment and what is received of the enhancement layer segment to be sent following, or at the end of, the prescribed time period.

Optionally, the segment comprises a plurality of segment units of data, each segment unit of data having a corresponding base layer unit and a corresponding enhancement layer unit. Preferably, each base layer unit is decodable independently from other base layer units. Preferably, each enhancement layer unit is decodable with its corresponding base layer unit independently from other base layer units or other enhancement layer units.

Optionally, the encoded data stream represents media data. Preferably, the segment is a part-second or a multi-second part of the media data. Preferably, the segment comprises data representing a plurality of frames of video data, and each frame is represented by a base layer unit and an enhancement layer unit.

Optionally, the prescribed time is related to the amount of data in the segment. Preferably, the prescribed time is related to a playback time of the segment. Preferably, the prescribed time is less than the playback time of the segment.

Optionally, the reproduction quality is or is related to one or more of the following: resolution; compression; samples per second; or frames per second.

There is also provided a computer-readable medium having stored thereon instructions to cause the above-described method to be performed by a computer.

BRIEF DESCRIPTION OF THE DRAWINGS

Embodiments of the invention will now be described with reference to the accompanying drawings, in which.

DETAILED DESCRIPTION OF THE EMBODIMENT(S)

Embodiments of the present inventions will be now described with reference to the attached Figures. It is to be noted that the following description is merely used for enabling the skilled person to understand the present invention, without any intention to limit the applicability of the present invention to other embodiments which could be readily understood and/or envisaged by the reader.

Figure 1:
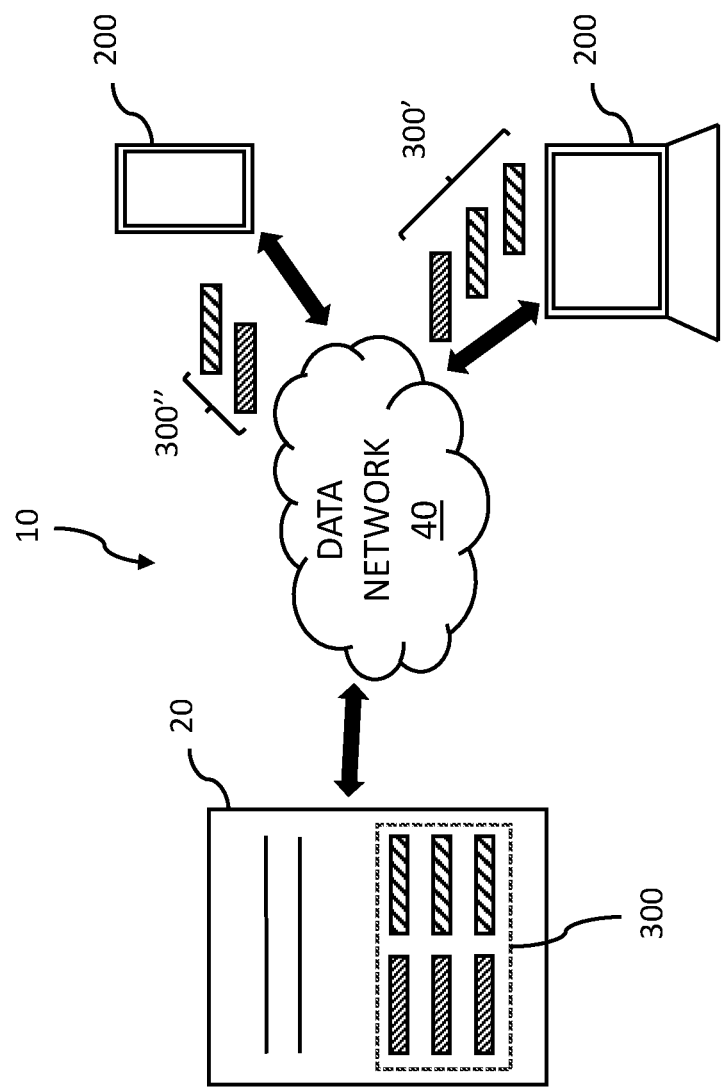
FIG. 1 is a block diagram showing a system for performing an example adaptive bitrate decoding method.

FIG. 1 is a block diagram showing a system 10 for performing an example adaptive bitrate decoding method. The system 10 comprises a streaming server 20 which is arranged to deliver encoded data 300 via one or more encoded data streams 300', 300" over a data network 40 to one or more client devices 200, each client device 200 including a corresponding data decoding capability to decode a relevant one of the encoded data streams 300', 300".

The streaming server 20 can be any suitable data storage and delivery server which is able to deliver encoded data to the client devices 200 over network 40. Streaming servers are well known in the art, and may use unicast and multicast protocols. The streaming server is arranged to store the encoded data 300, and provide the encoded data in the one or more encoded data streams 300', 300" to the client devices 200. The encoded data 300 is generated by an encoder (not shown in FIG. 1), which may be located on the streaming server 20, or elsewhere. The encoder may operate to generate the encoded data 300 for on-demand streaming, or may operate to provide a live streaming service, where the encoded data 300 is generated in substantially real-time for real-time streaming of un-encoded data which is being produced in real-time.

The client devices 200 can be any suitable data streaming device, or streaming client, and known client devices 200 include set-top boxes, digital televisions, smartphones, tablet computers, laptop computers, desktop computers, video conferencing suite technology, etc.

The network 40 can be any type of data network suitable for connecting two or more computing devices together, such as a local area network or a wide area network, and can include terrestrial wireless and wired connections, and satellite connections. The data network 40 may also be or include telecommunications networks, and in particular telecommunications networks that provide cellular data coverage. It is expected that the data network 40 would include the Internet, and connections thereto.

In the example embodiment described, the encoded data 300 comprises encoded video data, and the client devices 200 request the encoded video data 300 for presentation to a user. The invention may also be applied to encoded audio data, including multi-channel and high-definition audio data (24 bit, 96 kHz and above). The encoded audio data may be included with the encoded video data in a multimedia stream as separate video and audio streams. The invention may also be applied to other types of data of interest to a user, which is designed to be viewed, used or otherwise consumed continuously. For example, the encoded data 300 could include any other type of data, including a sound signal, multichannel sound signal, picture, two-dimensional image, multi-view video signal, 3D video signal, volumetric signal, volumetric video signal, medical imaging signal or a signal with more than four dimensions, and all the apparatuses, systems and methods described herein should apply mutatis mutandis to those types of data signals.

Figure 2:
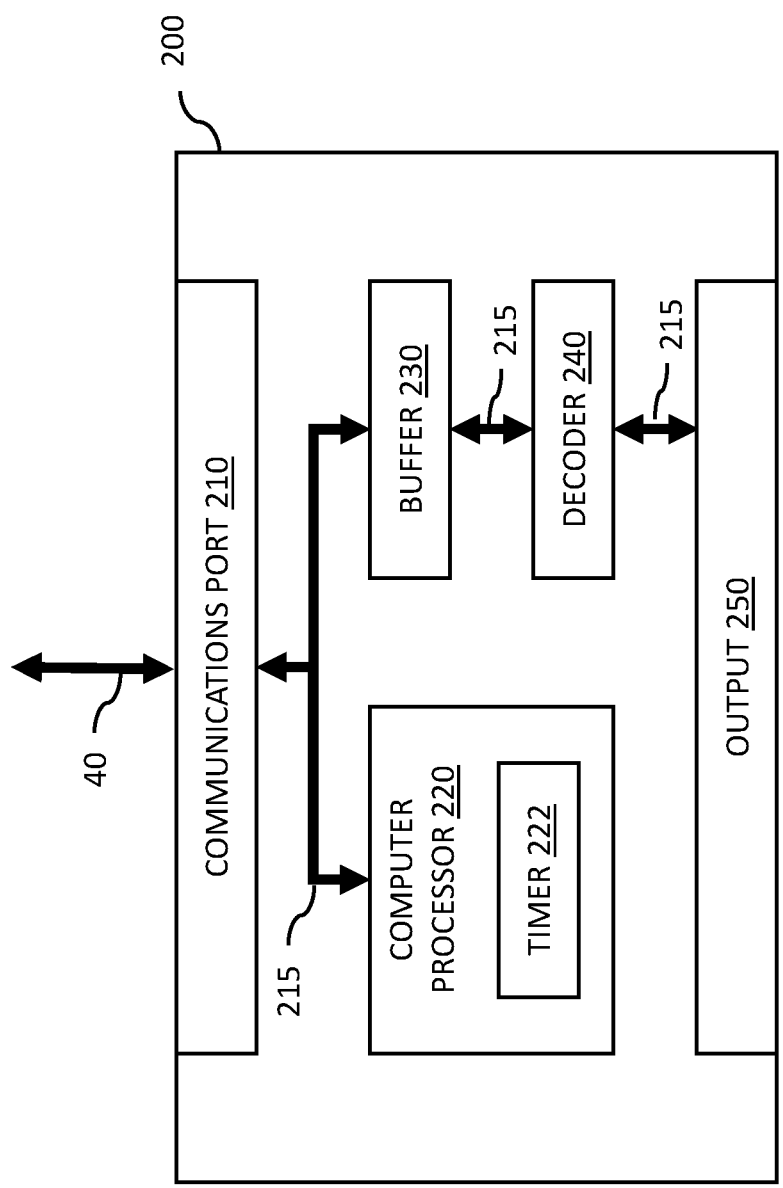
FIG. 2 is a block diagram showing an example client device having an adaptive bitrate decoding capability.

FIG. 2 is a block diagram showing an example client device 200 having dynamically adaptive bitrate decoding capability. The client device 200 comprises a communications port 210, a computer processor 220 including a timer 222, a buffer 230, a decoder 240 and an output 250.

The computer processor 220 is configured to initiate and control reception of the encoded data stream 300' via the communications port 210, which is in turn configured to communicate with the streaming server 20 across the data network 40. The buffer 230 is configured, under the control of the computer processor 220, to buffer, or cache, the encoded data stream 300' on arrival at the client device 200, before sending the buffered part of the encoded data stream 300' to the decoder 240 for decoding after a prescribed time period. The decoder 40 is configured to decode the buffered part of the encoded data stream 300' and to pass the decoded data to the output for presentation to a user of the client device 200.

Clearly, the above description is a simplified version of how encoded data streams are buffered, decoded and, if appropriate, output, and is provided not as a comprehensive discussion as to how the decoding and display of encoded data in client devices works, but so as to give sufficient context in which to explain the invention. Also, it is envisaged that the dynamically adaptive bitrate decoding method discussed is primarily applicable to video data (and the present application is discussed with reference to video data for easiness of understanding) but the anticipated applications are broader than video, and may include audio decoding, as well as other types of data decoding, as mentioned above.

Figure 3:
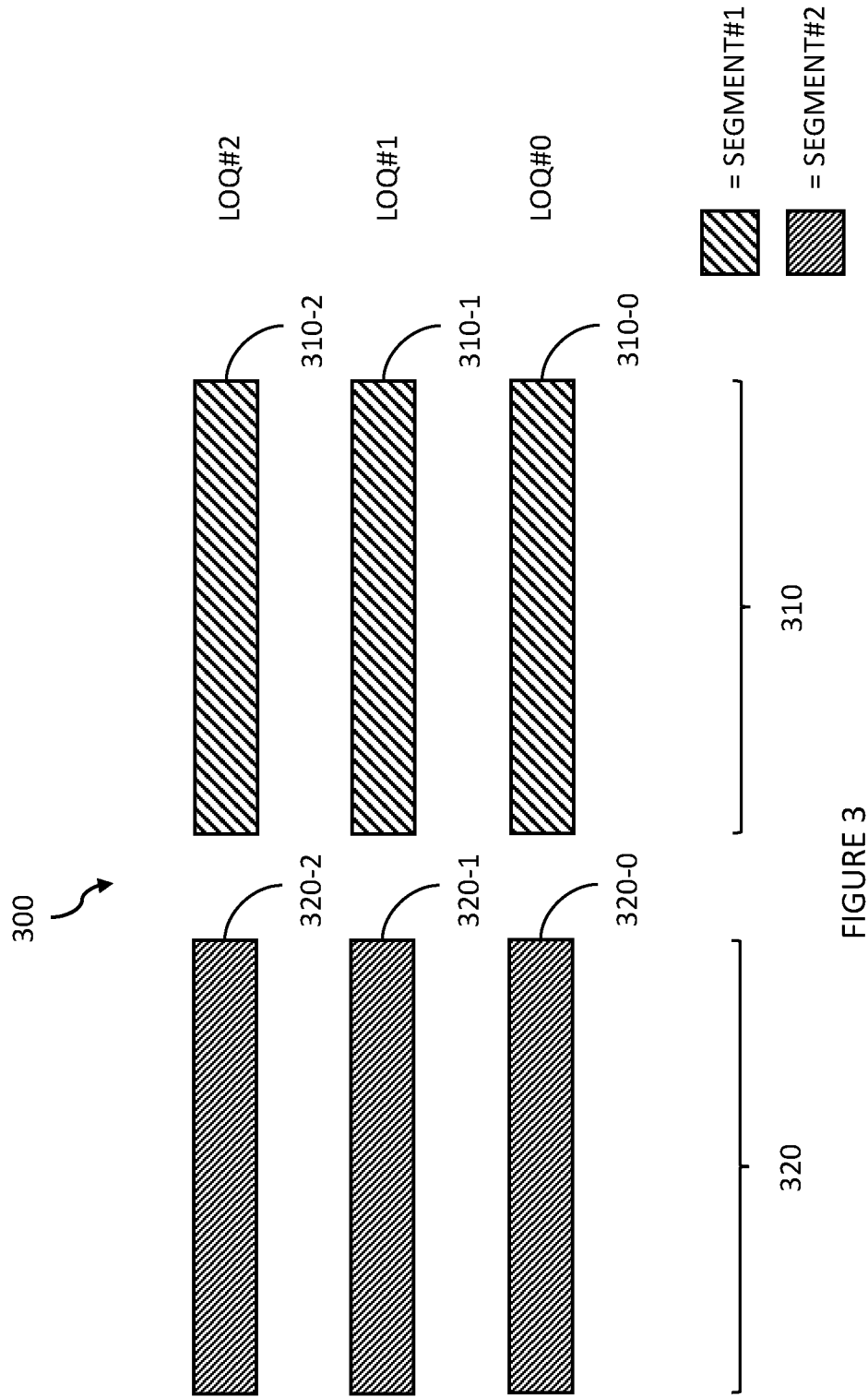
FIG. 3 is an abstract example illustration of encoded video data arranged in segments and hierarchical layers.

FIG. 3 is an abstract example illustration of the encoded video data 300 stored on the streaming server 20, and which is used as a repository from which the one or more encoded data streams 300', 300" are created.

The encoded video data 300 is arranged into a plurality of segments, two of which are shown in FIG. 3, namely first segment 310 also named segment#1, and second segment 320 also named segment#2. The two segments 310, 320 are shown for ease of illustration, but in theory there could be any number of segments, from one segment upwards, although the dynamically adaptive bitrate streaming technique is best implemented when there are many segments.

Each segment 310, 320 is typically a multi-second part of the encoded video data 300, but may be a part-second part of the encoded video data 300, and may represent a single frame of video up to several thousand frames of video. A configuration file (not shown), is also normally stored on the streaming server 20 and is available to the client devices 200. The configuration file allows the client devices 200 to understand the order in which segments 310, 320 of the encoded video data 300 should be requested and to allow the client devices 200 to request the segments. Each segment 310, 320 may be requested separately from other segments, and may be individually downloaded by the client devices 200.

The encoded video data 300 is also arranged in a plurality of hierarchical layers, and in this illustrative example three hierarchical layers, namely a base layer LOQ#0, a first enhancement layer LOQ#1, and a second enhancement layer LOQ#2, so that each segment is split into three corresponding segment layers. Of course, the encoded data could have more than three segment layers (e.g., N segment layers) for instance depending on the number of profiles required to be supported.

In more detail, segment#1 310 comprises:
- a base layer segment 310-0 in hierarchical layer LOQ#0 which contains encoded video data decodable to a base level of reproduction quality, and
- a first enhancement layer segment 310-1 in hierarchical layer LOQ#1 which, together with the corresponding base layer segment 310-0, contain encoded video data for segment#1 which is decodable to a first enhanced level of reproduction quality, which is of greater reproduction quality than the base level of reproduction quality.

Segment#1 310 may comprise a further, second, enhancement layer segment 310-2 in hierarchical layer LOQ#2 which, together with the corresponding base layer segment 310-0, and first enhancement layer segment 310-1, contain encoded video data which is decodable to a further second enhanced level of reproduction quality which is of greater reproduction quality than the first enhanced level of reproduction quality. As will be apparent to the reader, it is also convenient to name the levels of reproduction quality consistent with the hierarchical layers, so the base level of reproduction quality is named LOQ#0, the first enhancement level of reproduction quality is named LOQ#1, and the second enhancement level of reproduction quality is named LOQ#2.

Segment#2 320 is similar to segment#1 310 in comprising a base layer segment 320-0 in hierarchical layer LOQ#0, an enhancement layer segment 320-1 in hierarchical layer LOQ#1 and further, second, enhancement layer segment 320-2 in hierarchical layer LOQ#2.

While every segment 310, 320 in the encoded data stream 300 must have a base layer segment, the segments do not need to have the same number of enhancement layer segments 310-1, 310-2, 320-1, 320-2. For example, segment#1 may have only one enhancement layer segment 310-1, while segment#2 may have two enhancement layer segments 320-1, 320-2, or more, or no enhancement layer segments. The same applies to every segment in the encoded video data 300, which may have zero, one, or more enhancement layer segments. The arrangement of the encoded video data 300 will depend on the precise type of video data, and may be determined by the encoder used to encode the encoded video data 300. Also, it is typical for segment layers of the encoded video data 300 to be encoded to the same level of quality, such as all base layer segments being encoded to the same base level of reproduction quality LOQ#0, but exceptions may apply depending for example on the constraints of the encoding process. Base layer segments may differ in level of quality between segments, as might enhancement layer segments.

To illustrate further, example levels of reproduction quality for each layer, and associated layer bit rates (and hence minimum bandwidths) are shown in Table 1 below.

TABLE 1

| Segment Layer | Encoder Profile | Resolution | Frames per Second | Layer Bit Rate | Cumulative Bandwidth required |
|---|---|---|---|---|---|
| LOQ#2 | C | 1080p | 30 fps | 0.5 Mbit/s | 2 Mbit/s |
| LOQ#1 | B | 1080p | 15 fps | 0.75 Mbit/s | 1.5 Mbit/s |
| LOQ#0 | A | 360p | 15 fps | 0.75 Mbit/s | 0.5 Mbit/s |

As shown in Table 1, base layer segments 310-0, 320-0 are encoded using encoder profile A, which gives a relatively low base resolution of 360p (480×360) at 15 frames per second (fps) at a bit rate of 0.75 Mbit/s. This allows client devices 200 having relatively low bandwidth connections across data network 40 to at least stream the base layer segments 310-0, 320-0 and produce a viewable output (the bandwidth available must match or exceed the bit rate to enable playback without pauses). The base layer segments may be encoded to have lower bit rates, or higher bit rates.

In a preferred embodiment, the base layer segments 310-0, 320-0 are encoded using well-known codecs, such as for example the H.264/MPEG-4 AVC family of codecs or any derived codecs (e.g., H.265/HEVC). On the other hand, the base layer could also be part of a proprietary codec such as the ones in the PERSEUS™ family. However, the base layer could also form part of a hierarchical coding structure such as that described in patent publication numbers U.S. Ser. No. 13/188,226 and U.S. Ser. No. 13/188,201 which are incorporated herein by reference.

The first enhancement layer segments 310-1, 320-1 are encoded using encoder profile B, which gives an enhanced resolution of 1080p (1920×1080) at 15 fps at a layer bit rate of 0.75 Mbit/s. The encoded information in the first enhancement layer LOQ#1 is advantageously enhancement information, which is used to enhance the information in the base layer LOQ#0. To use the first enhancement layer segments 310-1, 320-1, the bandwidth of the connection between the client device 200 and the streaming server 20 over data network 40 must be equal to or greater than the combined bit rates of respective base layer segments 310-0, 320-0 and first enhanced layer segments 310-1, 320-1, i.e. equal to or greater than 1.5 Mbit/s. This allows client devices 200 having higher bandwidth connections across data network 40 to at least stream the base layer segments 310-0, 320-0 and the first enhancement layer segments 310-1, 310-1 to output video at an improved quality of reproduction.

The second enhancement layer segments 310-1, 320-1 are encoded using encoder profile C, which gives an enhanced resolution of 1080p (1920×1080) at 30 fps at a layer bit rate of 0.5 Mbit/s. The encoded information in the first enhancement layer LOQ#2 is also enhancement information, which is used to enhance the information in the base layer LOQ#0 and first enhancement layer LOQ#1. To use the second enhancement layer segments 310-2, 320-2, the bandwidth of the connection between the client device 200 and the streaming server 20 over data network 40 must be equal to or greater than the combined bit rates of lower layer segments 310-0, 310-1, 320-0, 320-1 and second enhancement layer segments 310-2, 320-2, i.e. equal to or greater than 2 Mbit/s. This allows client devices 200 having even higher bandwidth connections across data network 40 to at least stream the base layer segments 310-0, 320-0, the first enhancement layer segments 310-1, 320-1, and the second enhancement layer segments 310-2, 320-2 to output video at a further improved quality of reproduction.

Of course, the skilled reader will appreciate that the particular resolution, bit rate, codec used, signal-to-noise ratio, or other encoder profile parameter for a particular layer will be application specific. In general, it may be advantageous to have many enhancement layers, so that a fine increase in quality of reproduction can be achieved for higher available bandwidths, and consequently, a fine decrease in quality of reproduction for lower available bandwidths.

As mentioned before, each segment 310, 320 may be requested individually, i.e. separately from other segments, and transmitted separately by the streaming server 20 to the client device 200. For example, when first segment 310 is requested, each layer LOQ#0. LOQ#1, LOQ#2 is transmitted in the encoded data stream 30 in order of lowest level of quality first, so that the base layer segment 310-0 would be sent first, followed by the first enhancement layer segment 310-1, and then followed by the second enhancement layer segment 310-2, and so on, until either all layers for the first segment 310 are transmitted, or the streaming server 20 is requested to transmit the next segment 320. Here, the second segment 320 is requested by the client device 200, and the base and enhancement layer segments would typically be delivered in the same order as for segment#1 310 until either all layers for the second segment are transmitted, or the streaming server 20 is requested to transmit the next segment.

Alternatively, base and enhancement layer segments may be requested and downloaded individually, so that the client device 200 has control over when download of each segment layer begins. Advantageously, for each segment such as segment#1, the base layer segment 310-0 encoded at a base level of quality level LOQ#0 would be downloaded first before a request for first enhancement layer segment 310-1 at LOQ#2 is made, and so on. This arrangement gives client device 200 more control to use network bandwidth and processing energy more dynamically and efficiently, as discussed further below.

Figure 4:
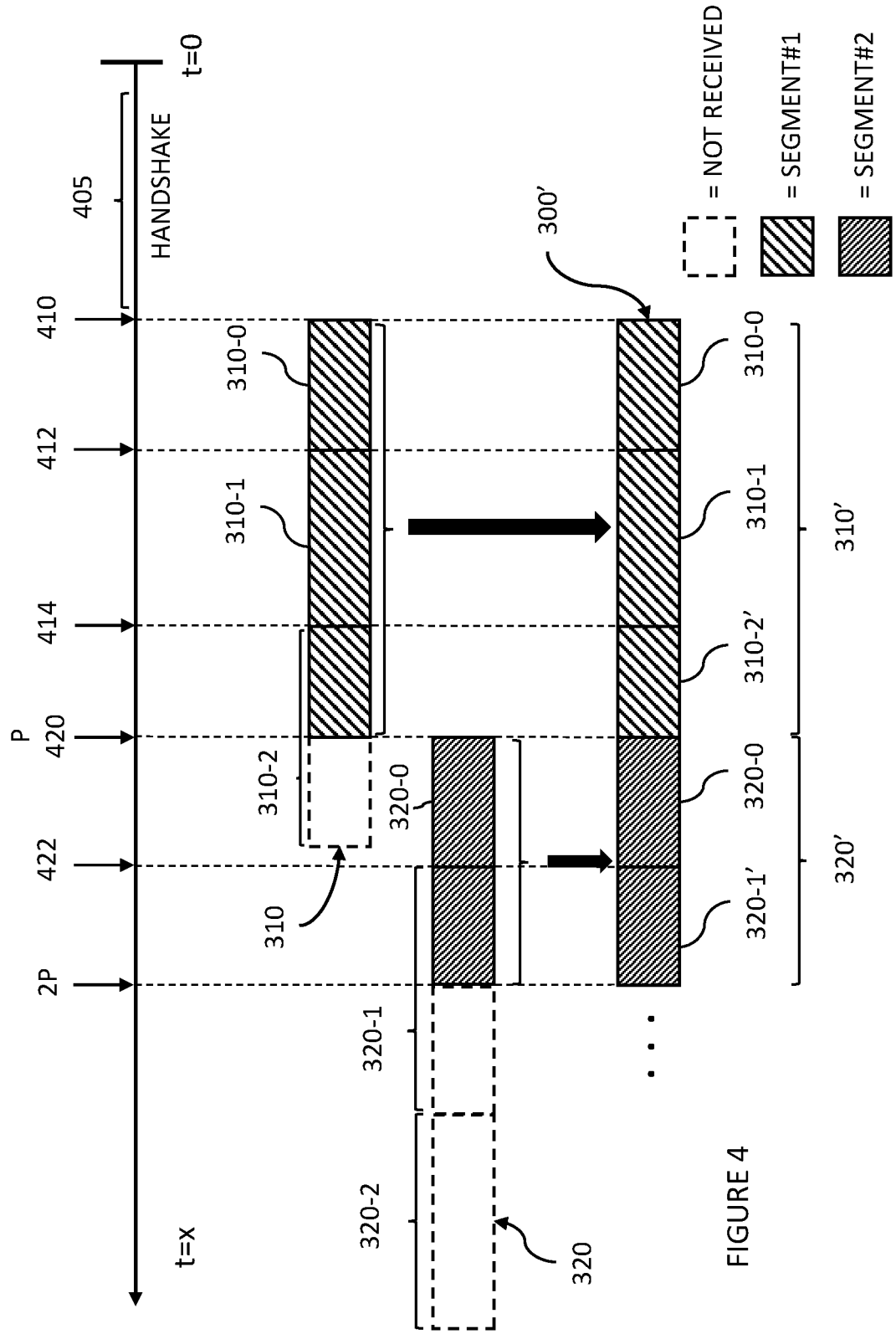
FIG. 4 is an abstract example time-line illustration of how and when an encoded video data stream is arranged from the encoded video data of FIG. 3.

FIG. 4 is an abstract example time-line illustration of how and when an encoded video data stream 300' received at one of the client devices 200 is arranged from the encoded video data 300 stored on the streaming server 20, illustrated in FIG. 3.

A timeline 400 is shown beginning at a first time, t=0, shown on the right-hand-side of FIG. 4, and continuing until an arbitrary future time, t=x, shown on the left-hand-side of FIG. 4. Precise timings are not shown on the timeline, but rather the order of major events in the requesting and downloading of segments 310, 320 of the encoded video data 300, once the encoded video data 300 is located on the data network 40. It is not within the scope of this disclosure to describe how the encoded video data 300 is chosen and located. To indicate when only partial data is buffered in buffer 230 (i.e. not all of the encoded video data 300 available on streaming server 20), a prime symbol (') is added to the end of the reference sign.

Firstly, an optional handshake 405 is performed between the client device 200 and the streaming server 20. The handshake 405 allows the client device 200 to negotiate downloading parameters with the streaming server 20, such as by downloading a configuration file (not shown) with the order and location of the data segments 310, 320 of the encoded video data 300. However, the configuration file may be obtained by other means, such as by email, from another server over data network 40 or another network (not shown), or by another form of file transfer from another source (not shown). The configuration file may also include information on how many enhancement layers are available, and the encoding properties of those layers, such as the information shown in Table 1, so that the client device 200 is able to decide intelligently whether to request and download higher quality enhancement layer segments 310-1, 310-2, for the encoded video data 300. By way of example here, if a client device has a resolution lower than the resolution encoded in a hierarchical layer LOQ#2, then there would be bandwidth and processing energy wastage attempting to download and buffer enhancement layer segments 310-2, 320-2 corresponding to the hierarchical layer LOQ#2, which ultimately would contain data that is not usable by the client device 200 in presenting decoded video data to a user. Similarly, a client device may not be able to decode at bit rates over a certain amount, and so enhancement layer data which would result in such bit rate requirements would be wasted, and is therefore not requested by the client device 200. The handshake 405 may also allow the client device 200 to obtain information on the length of the encoded video data 300 in seconds or other units, the codecs used, and addressing information. In an alternative embodiment, the decoder will download from the encoded video data without pre-determining how much data it will be able to download in a predetermined time period which may be chosen arbitrarily, and will use whatever data was successfully downloaded.

The client device 200 derives a prescribed time period P for buffering a requested segment 310, 320 of the encoded video data 300. The prescribed time period P is important for realising the invention, because it controls how the encoded data stream 300' is created. Together with the hierarchical arrangement of the encoded video data 300 into segment layers of increasing quality, an improved dynamically adaptive bitrate streaming technique is achieved, which is able to respond to fluctuating bandwidth on the network 40 more quickly and with less disruption to a user. A greater quality of output is achieved with fewer re-cache or re-buffer events. More detailed explanation follows.

For example, at the end of the handshake 405, the client device 200 discovers that the encoded video data 300 is arranged in segments 310, 320 each having playback durations of 5 seconds. Therefore, in a preferred embodiment the prescribed time period P can be set to be 5 seconds, or slightly less. The client device 200 makes a first segment request 410 to the streaming server 20 for the first segment 310 of encoded video data 300. The identifier for the first segment 310 is typically discovered from the configuration file, or possibly another source. The base layer segment 310-0 at LOQ#0 is then transmitted to client device 200 over network 40 and forms the first part of encoded data stream 300' representing the encoded video data 300. The base layer segment 310-0 has a very high chance of being received by the client device 200 and buffered in buffer 230 before the prescribed time period P expires. This is because the base layer segment 310-0 is encoded at the lowest level of quality relative to the enhancement layer segments 310-1, 310-2, and so the amount of data required to be transmitted for the segment of video data 310 to achieve a base level of reproduction is relatively low, or put another way the bit rate of the base layer segment 310-0 is relatively low. From the example shown in Table 1, the bit rate of LOQ#0 segments, i.e. base layer segment 310-0 in this instance, is 0.75 Mbit/s. If the available bandwidth on data network 40 is greater than 0.75 Mbit/s, then the base layer segment 310-0 will be received and buffered by the client device 200 well within the 5 second playback time.

Looking again at FIG. 4, in this example, the bandwidth available is greater than 0.75 Mbit/s and so the base layer segment 310-1 is transmitted on encoded data stream 300' and is received by client device 200 while the prescribed time period P is yet to expire.

Once the base layer segment 310-0 is transmitted by streaming server 20 then the first enhancement layer segment 310-1 at LOQ#1 which is next in the structure of hierarchical layers is transmitted by streaming server 20 automatically at segment layer point 412. Alternatively the first enhancement layer segment 310-1 is requested by the client device 200, typically as soon as or shortly after the base layer segment 310-0 is buffered in buffer 230 and is also shown at point 412. In either case, first enhancement layer segment 310-1 is next in the encoded data stream 300' and follows the base layer segment 310-0. From Table 1, the bit rate of LOQ#1 segments, i.e. first enhancement layer segment 310-0 in this instance, is 0.75 Mbit/s. If the available bandwidth on data network 40 is greater than an average of 1.5 Mbit/s for transmission of the base layer segment 310-0 and the first enhancement layer segment 310-1, then the first enhancement layer segment 310-1 will also be received and buffered by the client device 200 within the 5 second prescribed time period, in this case related to the 5 second playback time.

Looking again at FIG. 4, in this example, the bandwidth available is greater than 1.5 Mbit/s and so the first enhancement layer segment 310-1 is transmitted on encoded data stream 300' and is received by the client device 200 while the prescribed time period P is yet to expire.

Once the first enhancement layer segment 310-1 is transmitted by streaming server 20 then the second enhancement layer segment 310-2 at LOQ#2, which is next in the structure of hierarchical layers, is transmitted by streaming server 20 automatically at segment layer point 414, or is requested by the client device 200 once the first enhancement layer segment 310-1 is received, depending on how the system 10 is configured and is also shown at point 414. In either case, second enhancement layer segment 310-2 is next in the encoded data stream 30 and follows the first enhancement layer segment 310-1. From Table 1, the bit rate of LOQ#2 segments, i.e. first enhancement layer segment 310-0 in this instance, is 0.5 Mbit/s. If the available bandwidth on data network 40 is greater than an average of 2 Mbit/s for transmission of the base layer segment 310-0 and the first enhancement layer segment 310-1, then the first enhancement layer segment 310-1 will also be received and buffered by the client device 200 well within the 5 second playback time.

However, in this example, the average bandwidth is less than 2 Mbit/s and so the second enhancement layer segment 310-2 is only partially transmitted on encoded data stream 300', and is received only partially by the client device 200. The partial second enhancement layer segment is labelled as 310-2' in encoded data stream 300'. The partial second enhancement layer segment 310-2' is partially buffered in buffer 230 when the prescribed time period P expires.

In a preferred embodiment, on or shortly after expiry of the prescribed time period P or timer (note that the timer can be stopped once the entire content has been downloaded), the contents of buffer 230 are transferred to the decoder 240 for decoding and presentation to a user via output 250 at an appropriate time. The contents of the buffer 230 comprise base layer segment 310-0, first enhancement layer segment 310-1, and partial second enhancement layer segment 310-2'. Also, at or very shortly after expiry of the prescribed time period P, client device 200 makes a next segment request 420 to streaming server 20 for the next segment of the encoded video data 300, which in this illustrative example is the second segment 320. Client device 200 ignores any further incoming data relating to the first segment 310, and streaming server 20 stops transmitting encoded video data for the first segment 310. In this way, network bandwidth and processing energy are conserved. The base layer segment 320-0 of segment#2 at LOQ#0 is then transmitted to client device 200 over network 40 and forms the next part of encoded data stream 300' representing the encoded video data 300. As will now be apparent, in this way, the amount of the encoded video data 300 which is included in the encoded data stream 300' dynamically adjusts in real-time or near real-time (within a small fraction of a second) to the available bandwidth on the data network 40. Put another way, the bit rate per segment 310, 320 of encoded data stream 300' is dynamically and automatically adjusted to match the available bandwidth. In further embodiments the base layer may be sent prior to the expiry of the prescribed time period P, for example when the buffer is still being filled with data during the prescribed time period.

This process repeats for the second segment 320, and here base layer segment 320-0 is fully received and buffered in buffer 230 of the client device 200 within the prescribed time period P (in this case, the prescribed time period is constant between segments of the encoded video data at 5 seconds because the segment playback times are constant). However, a partial first enhancement layer segment 320-1' is received and buffered prior to expiry of the prescribed time period P. In the same way as described for the first segment 310, the contents of buffer 230 are transferred to the decoder 240 for decoding and presentation to a user via output 250 at an appropriate time. The contents of the buffer 230 comprise base layer segment 320-0, and partial first enhancement layer segment 310-1'. Also, at or very shortly after expiry of the prescribed time period P, client device 200 requests from streaming server 20 the next segment of the encoded video data 300. All further data relating to the second segment is ignored by the client device 200, and the streaming server 20 stops sending further encoded video data relating to the second segment 310.

The process continues until the final segment of encoded video data 300 is requested by the client device 200, or the client device 200 decides to stop streaming the encoded video data 300. While not typical, it may be that a base layer segment cannot be fully received and buffered at the client device 200 before the prescribed period P expires. In this situation, whatever is received of the particular base layer segment is sent to the decoder 240 for presentation to the user. When there is no further information available to decode and output, a prediction model may be used, the same output may be maintained, the output may be paused until the remaining base layer segment information is received or a null output may be presented until the next segment is transferred into the buffer 230. This unusual situation may also be extended to the case where no data of the base layer segment is able to be received at the client device, due to a loss of available bandwidth to the client device 200. Of course, as long as a base layer segment is available, and this is most likely, then at least some output is available, even if at a base level of quality.

As can be seen in FIG. 4, the encoded data stream 300' comprises a received first segment 310' and a received second segment 320', illustrating that, for each segment 310, 320 not all of the segment layer information available in encoded video data 300 at hierarchical layers LOQ#0, LOQ#1 and LOQ#2 is transmitted to, stored on or buffered at the client device 200.

The prescribed time P is derived based on the amount of data in each segment, and which, in the illustrated example, relates to time required to present that data to a user, also referred to as a playback time of the segment. For example, if the first segment 310 is a two second segment of the encoded video data 300, then the prescribed time to receive and buffer as many of the segment layers 310-0, 310-1, 310-2 as possible may be set to be two seconds, i.e. the same as the playback time. Alternatively, the prescribed time may be less than the playback time, to allow for network requests for following segments to be made, and to allow for the movement of buffered data in buffer 230 to the decoder 240, or for another reason, for example to allow received segment data (including as much segment layer data as possible in the prescribed period) to be stored for a longer period prior to output at the client device, so that any network disruptions may be effectively smoothed out, i.e. the stored information may be used while the network is exhibiting poor bandwidth performance, rather than dropping immediately to a lower reproduction quality for following segments. Here, the prescribed time period P may be dynamically adjusted to be longer while there remains stored segment data at the client device 200 and poor bandwidth conditions, so that the reproduction quality of subsequent segments is increased compared to a situation of not storing segments ahead of time. This increases consistency of output to a user.

Figure 5:
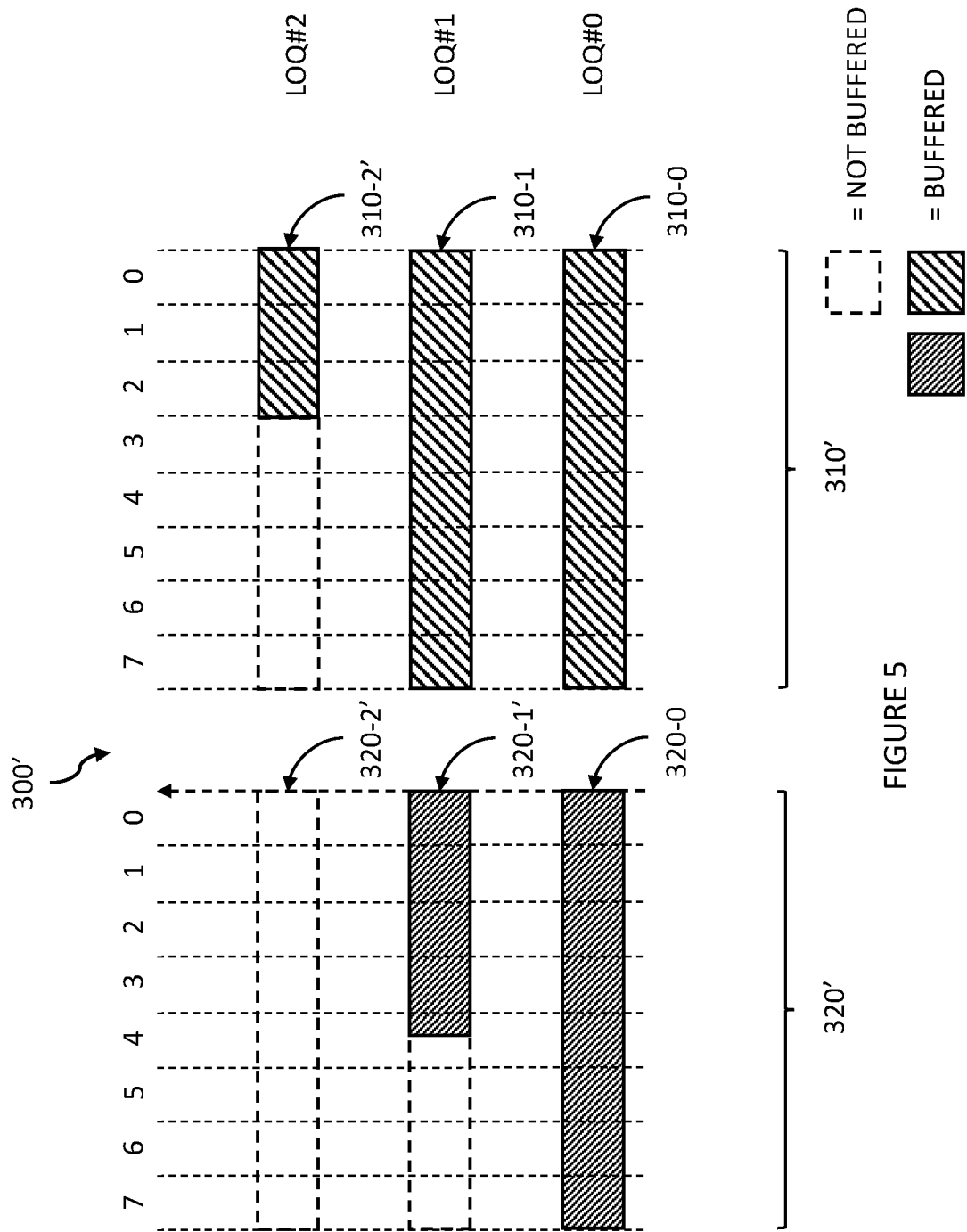
FIG. 5 is an abstract example illustration showing how much of the encoded video data of FIG. 3 is received and buffered at the client device of FIG. 2, and showing segment units in each hierarchical layer.

FIG. 5 is an abstract example illustration showing how much of the encoded video data 300 of FIG. 3 is received and buffered at the buffer 230 of the client device 200 via encoded data stream 300'. FIG. 5 shows each received segment 310', 320' broken down into a plurality of segment units 0, 1, 2 etc. The segment units are distributed evenly and uniformly across the segment layers LOQ#0, LOQ#1, LOQ#2.

For example, base layer segment 310-0 is shown broken down into a plurality of base layer segment units 310-0-0 to 310-0-7, in this example eight base layer segment units are shown. Likewise, first enhancement layer segment 310-1 has a corresponding eight first enhancement layer segment units 310-1-0 to 310-1-7, and optional second enhancement layer segment has a corresponding eight second enhancement layer segment units 310-2-0 to 310-0-7. Practically, it is expected that each segment layer LOQ#0, LOQ#1, LOQ#2 will be broken down into significantly more segment units than eight segment units. In this example embodiment, each segment unit represents a frame of video.

Advantageously, segment units in the base layer LOQ#0 may be encoded with inter-dependencies and need not be stand-alone independently decodable segment units.

For example, where an MPEG codec is used, there may be inter-dependency between frames (segment units) at the base layer LOQ#0, and one or several group of picture (GOP) structures may be used within each segment at the base layer LOQ#0. However, it is useful to have at least one enhancement layer LOQ#1, LOQ#2 where the segment units are independently decodable in that layer, but which enhance lower segment units, especially correspondingly lower segment units in the hierarchy, such as segment units in the base layer LOQ#0.

In more detail, where possible and desirable, and most commonly in enhancement layers LOQ#1, LOQ#2, each segment unit 0, 1, 2, etc. is decodable independently from other segment units. In other words, there is no inter-dependency between segment units in the same enhancement layer. In more detail, first enhancement layer segment unit 310-1-0 is decodable with its corresponding base layer segment unit 310-0-0 only, that is, independently from other base layer segment units, for example base layer segment unit 310-0-1, or other first or second (or further) enhancement layer segment units. Of course, it may be possible and desirable for base layer segment units themselves to be decodable independently from other base layer segment units. As already mentioned, each segment 310, 320 comprises data representing a plurality of frames of video data, and each frame is represented by a segment unit 0, 1, 2 etc.

As already described in relation to FIG. 4, not all of the available video data encoded in encoded video data 300 is buffered in buffer 230 of the client device 230. Following on from FIG. 4, in relation to the first segment 310, all of the base layer segment 310-0 and first enhancement layer segment 310-1 are buffered. However, the second enhancement layer segment 310-2' is partially complete in the buffer 230. Here, the first three segment data units 310-2-0, 310-2-1, 310-2-2 in hierarchical level LOQ#2 are buffered, and the remaining segment data units for the second enhancement layer segment 310-2 are not buffered, because of expiry of the prescribed time P.

For the second segment 320, similar is true in that that all of the base layer segment 320-0 is buffered, However, the first enhancement layer segment 320-1' is partially complete in the buffer 230. Here, the first four segment data units 320-1-0, 310-1-1, 310-1-2, 320-1-3 in hierarchical level LOQ#1 are buffered. In this case, only a part of segment data unit 320-1-4 is buffered in buffer 230, and is usable by the decoder 240.

The remaining segment data units for the first enhancement layer segment 320-1 are not buffered, because of expiry of the prescribed time P. The information of partly-buffered segment unit 320-1-4 may be used by decoder 240 to enhance base layer segment unit 320-0-4 as far as possible. This will depend on the encoding scheme used.

Figure 6:
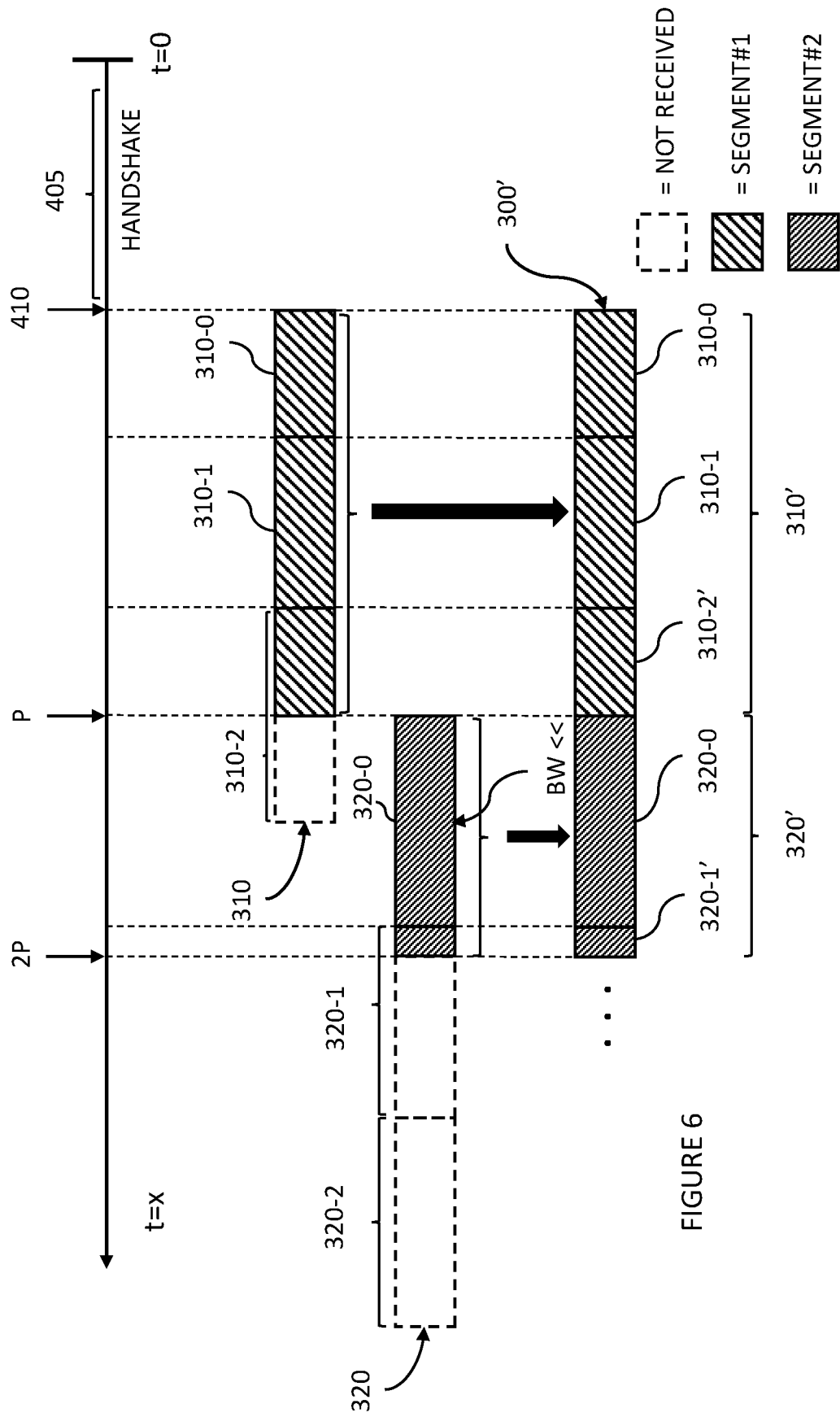
FIG. 6 is an abstract example time-line illustration, similar to FIG. 4, showing an effect of a suddenly reduced bandwidth.

FIG. 6 is an abstract example time-line illustration of received and buffered encoded video data stream 300' at the client device 200, showing an effect of a reducing bandwidth, BW<<, part-way through transmission of the second segment 320. Time is shown to increase from right to left, similar to FIG. 4, and only the differences between FIG. 4 and FIG. 6 are described.

Encoded data stream 300' is shown in relation to first segment 310 and second segment 320 of encoded video data 300. The encoded data stream 300' is received and buffered at the client device 200. The encoded data stream 300' comprises encoded and received first segment 310' for the first segment 310 of encoded video data 300 stored on the streaming server 20, and encoded and received second segment 320' for the second segment 320 encoded video data 320 stored on the streaming server 20. Not all of the encoded video data 300 is successfully transmitted to and received by the client device 200 by the expiry of the prescribed period P, but all of base layer segment 310-0 and first enhancement layer segment 310-1, and partial second enhancement layer segment 310'-2 are received in time. The remainder of second enhancement layer segment 310-2 not received by the client device is shown with a dashed outline. Nevertheless, the received first segment 310' can be decoded for presentation to a user, and at least includes some data to allow some decoding at the second level of enhancement, LOQ#2.

During the transmission of the second encoded video data segment 320 to the client device 200, there is a sudden bandwidth loss indicated by arrow labelled BW<<. At this time, almost all of base layer segment 320-0 has been received by client device 200, but not yet any of first enhancement layer segment 320-1. The reduced bandwidth remains at a level which allows the remainder of the base layer segment 320-0 to be received, but below a level that would allow all of the first enhancement layer segment 320-1 to be received at the client device by the expiry of the prescribed period P (illustrated by arrow 2P in FIG. 6), and so not all the data for first enhancement layer segment 320-1 is received. Nevertheless, the received enhancement layer segment 320' can be decoded for presentation to a user, and at least includes some data to allow some decoding at the first level of enhancement, LOQ#1.

Figure 7:
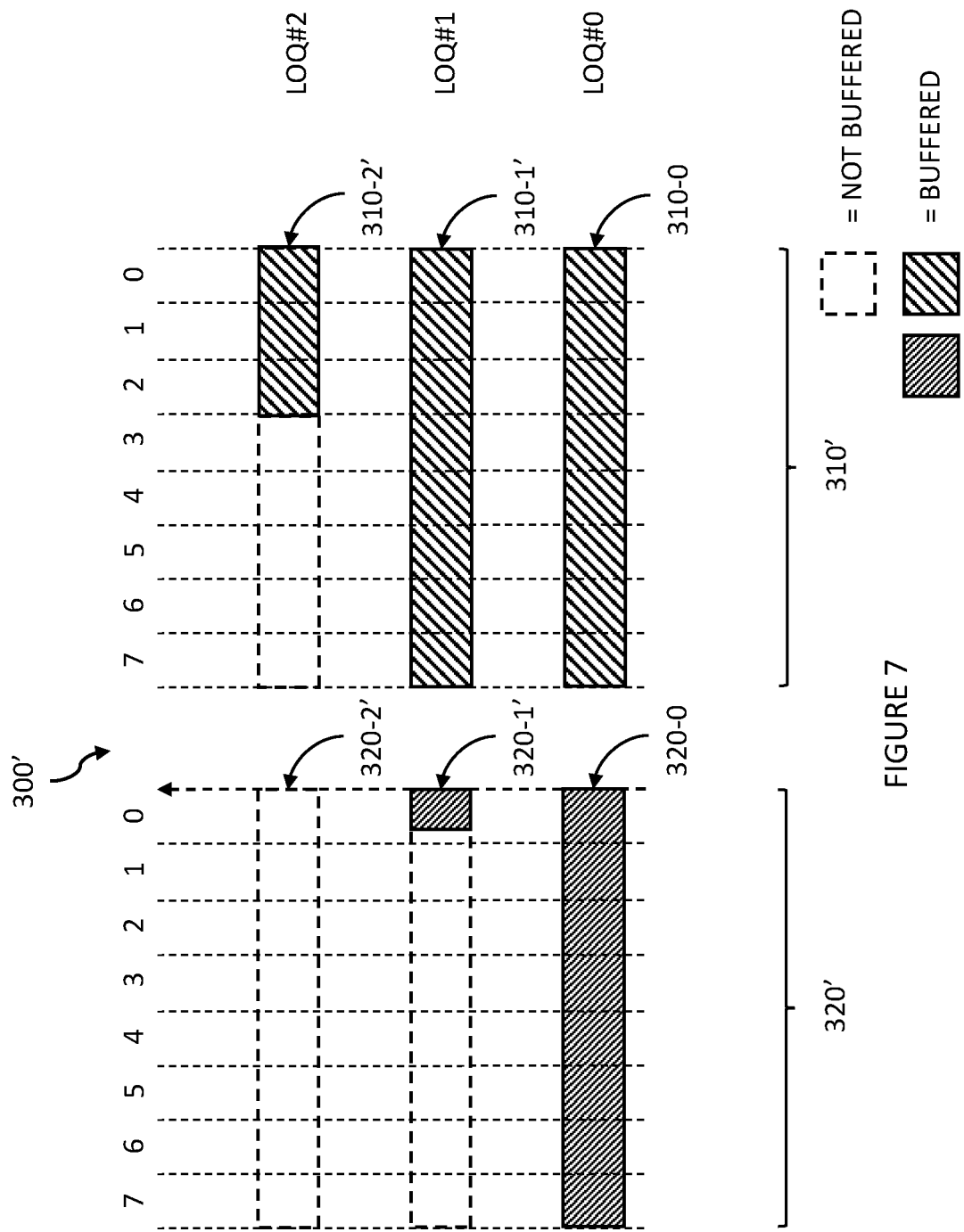
FIG. 7 is an abstract example illustration showing how much of the encoded video data of FIG. 3 is received and buffered as a result of the reduced bandwidth of FIG. 6.

FIG. 7 is an abstract example illustration showing received encoded data stream 300' of FIG. 6 in more detail. FIG. 7, like FIG. 5, shows each received segment 310', 320' broken down into a plurality of segment units 0, 1, 2 etc. The segment units are distributed evenly and uniformly across the segment layers LOQ#0, LOQ#1, LOQ#2.

As already described in relation to FIG. 6, not all of the available video data encoded in encoded video data 300 is buffered in buffer 230 of the client device 230. In relation to the first segment 310, all of the base layer segment 310-0 and first enhancement layer segment 310-1 are buffered. However, the second enhancement layer segment 310-2' is partially complete in the buffer 230. Here, the first three segment data units 310-2-0, 310-2-1, 310-2-2 in hierarchical level LOQ#2 are buffered, and the remaining segment data units for the second enhancement layer segment 310-2 are not buffered, because of expiry of the prescribed time P.

For the second segment 320, similar is true in that that all of the base layer segment 320-0 is buffered. However, the first enhancement layer segment 320-1' is partially complete in the buffer 230. Here, only a part of segment data unit 320-1-1 is buffered in buffer 230, and is usable by the decoder 240. The remaining segment data units for the first enhancement layer segment 320-1 are not buffered, because of expiry of the prescribed time P. Likewise, none of the second enhancement layer segment 320-2' is buffered. The information of partly-buffered segment unit 320-1-0 may be used by decoder 240 to enhance base layer segment unit 320-0-0 as far as possible. This will depend on the encoding scheme used.

Figure 8:
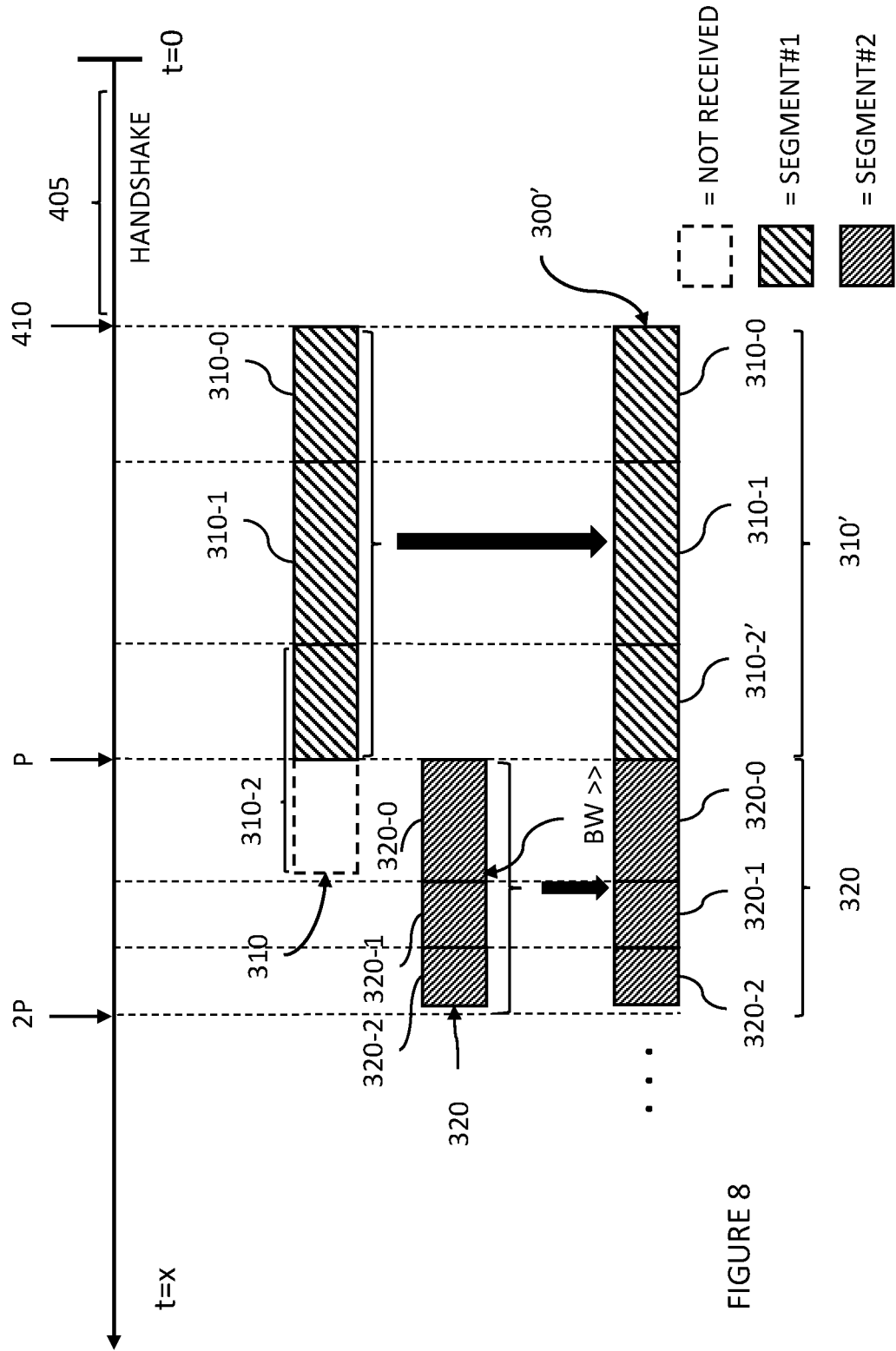
FIG. 8 is an abstract example time-line illustration, similar to FIG. 4, showing an effect of a suddenly increased bandwidth.

FIG. 8 is an abstract example time-line illustration of received and buffered encoded video data stream 300' at the client device 200, showing an effect of an increasing bandwidth, BW>>, part-way through transmission of the second segment 320. Time is shown to increase from right to left, similar to FIG. 6, and only the differences between FIG. 6 and FIG. 8 are described.

During the transmission of the second encoded video data segment 320 to the client device 200, there is a sudden bandwidth increase indicated by arrow labelled BW>>. At this time, almost all of base layer segment 320-0 has been received by client device 200, but not yet any of first enhancement layer segment 320-1. The bandwidth increase is such that the remainder of the base layer segment 320-0, all of the first enhancement layer segment 320-1, and all of the second enhancement layer segment 320-2 is received at the client device by the expiry of the prescribed period P (illustrated by arrow 2P in FIG. 8).

Figure 9:
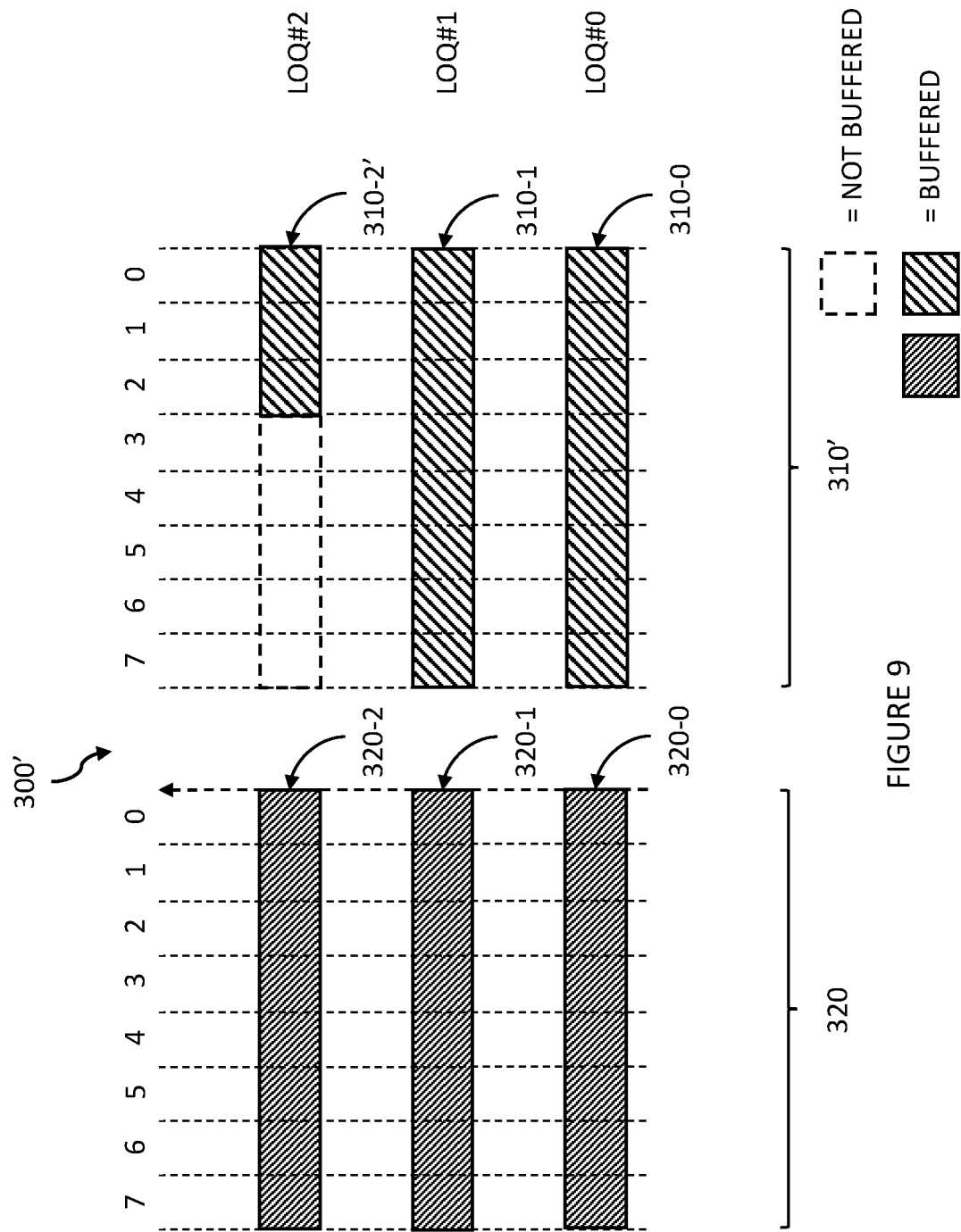
FIG. 9 is an abstract example illustration showing how much of the encoded video data of FIG. 3 is received and buffered as a result of the increased bandwidth of FIG. 8.

FIG. 9 is an abstract example illustration showing received encoded data stream 300' of FIG. 8 in more detail. FIG. 9, like FIG. 7, shows each received segment 310', 320 broken down into a plurality of segment units 0, 1, 2 etc. The segment units are distributed evenly and uniformly across the segment layers LOQ#0, LOQ#1, LOQ#2.

As already described in relation to FIG. 8, not all of the available video data encoded in encoded video data 300 is buffered in buffer 230 of the client device 230. In relation to the first segment 310, all of the base layer segment 310-0 and first enhancement layer segment 310-1 are buffered. However, the second enhancement layer segment 310-2' is partially complete in the buffer 230. Here, the first three segment data units 310-2-0, 310-2-1, 310-2-2 in hierarchical level LOQ#2 are buffered, and the remaining segment data units for the second enhancement layer segment 310-2 are not buffered, because of expiry of the prescribed time P.

For the second segment 320, all of segment 320 at each hierarchical layer is buffered. Therefore, the second data segment 320 may be decoded and presented to a user at a highest level of reproduction quality, i.e. at LOQ#2 for all segment units, or frames, of the second segment 320.

The system 10 and adaptive bit rate decoding method allows for the quality of the reproduction of the encoded video data 300 to adjust automatically and dynamically to the bandwidth available during segment transmission, without knowledge of the available bandwidth and without needing to decide which segment part to stream in advance. The system 10 and method are usefully scalable and useable with many video or data resolutions and client devices.

Figure 10:
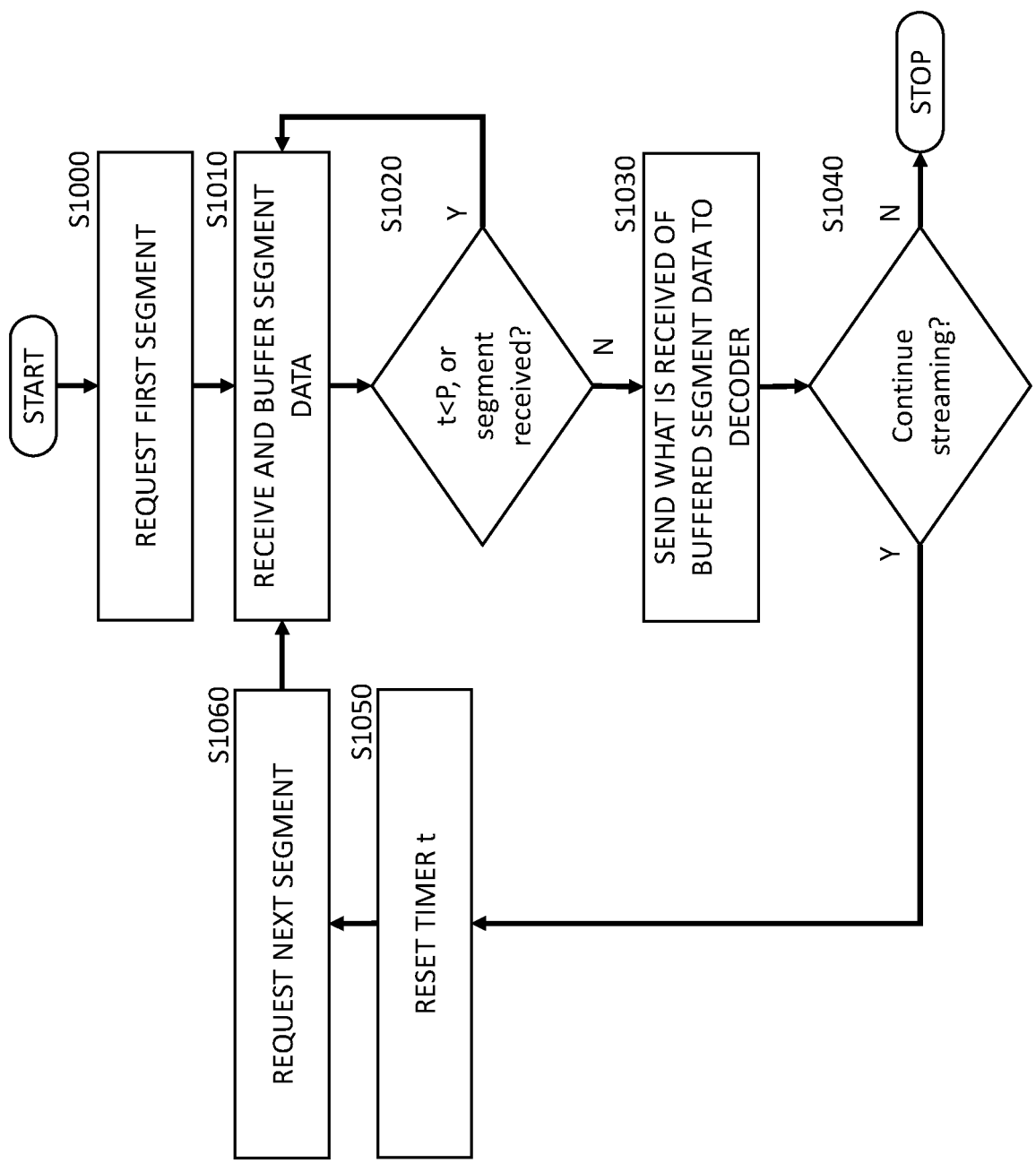
FIG. 10 is a flow chart outlining a method of buffering, at the client device of FIG. 2, an encoded data stream comprising segments arranged in hierarchical layers.

FIG. 10 is a flow chart outlining a method of buffering, at the client device 200 of FIG. 2, a segment of an encoded data stream, which may in this example illustration be the first segment 310.

The flow chart is described with reference to the steps shown on FIG. 10 in ascending number order as follows.

S1000: The client device 200 requests the first segment 310 from the encoded video data 300 on the streaming server 20 using the configuration file, or other means of information.

S1010: The client device 200 begins to receive and store the encoded data stream 300' including the first segment 310' in buffer 230.

S1020: The client device 200 monitors timer 222 and continues to receive and store the encoded data stream 300' in buffer 230 (S1010) until expiry of the prescribed time period P. When the prescribed time period P expires, no further information regarding the first segment 310 is stored in buffer 230, and the method moves to step S1030. If all required or expected segment layers of the first segment 310 is received and stored in buffer 230 within the prescribed time period P, then the method also moves to step S1030, or pauses until the expiry of the prescribed time period.

S1030: The received and stored first segment 310' is sent to the decoder 240 for output to a user, in the amount received within the prescribed time period P.

S1040: The client device 200 decides whether there are further segments to be streamed, based on the configuration file or other information, and if not the process stops. If further segments are to be streamed, then the method moves to step S1050.

S1050: The timer 222 is reset, and if appropriate, the value of the prescribed time period P is modified to suit the next segment or changing network conditions (such as increased bandwidth availability and a desire by the client device 200 to store more segments in memory during this opportunity). However, this can be achieved dynamically and automatically also by moving from S1020 to step S1030 as soon as the relevant segment data is fully received at the client device.

S1060: The client device 200 requests the next segment and the method repeats from S1010.

Full discussions on how the base layers and enhancement layers are encoded are given in international patent applications published as WO 2013/171173, WO 2014/170819, U.S. Ser. No. 13/188,226 and U.S. Ser. No. 13/188,201 all of which are incorporated herein by reference.

In this way, an improved dynamically adaptive bitrate streaming technique is achieved. For example, if required, the decoder is able to use only the base layer segment for decoding and presentation to a user, without using the enhancement layer segment, thus reducing initial buffering or viewing interruptions when the available bandwidth on the network fluctuates downwardly, especially but not exclusively during rapid downward fluctuations of bandwidth. Additionally, the hierarchical structure enables the decoder to use as much of the enhancement layer segment as received in the prescribed time period, without wasting the received enhancement layer segment information, and hence the bandwidth used to transmit that enhancement layer segment information. As a result, bandwidth is used more efficiently and an improved quality of video may be presented to a user. Also, when the network bandwidth fluctuates upwardly, the decoder may dynamically receive and use more enhancement layer segment information, thereby allowing for a quicker and more dynamic increase in the quality of output. As will now be apparent to the skilled reader, using a prescribed time period to buffer incoming segments of video, together with the use of a hierarchical video data structure in segments, has the ability to reduce disturbances or delays in video presentation in circumstances of varying bandwidth, thereby improving the user experience. Additionally, more dynamic and efficient use of bandwidth is achieved, thereby further improving the user experience.

Although at least some aspects of the examples described herein with reference to the drawings comprise computer processes performed in processing systems or processors, examples described herein also extend to computer programs, for example computer programs on or in a carrier, adapted for putting the examples into practice. The carrier may be any entity or device capable of carrying the program.

The use of modular structure such as the one depicted in any of the Figures provides also an advantage from an implementation and integration point of view, enabling a simple integration into legacy systems as well as compatibility with legacy systems. By way of example, the adaptive bit rate coding method could be embodied as a plug-in (including libraries and/or source code) to an existing firmware and/or software which already embodies a legacy decoding system (for example one that is already installed in legacy decoders).

It is to be understood that any feature described in relation to any one embodiment may be used alone, or in combination with other features described, and may also be used in combination with at least one feature of any other of the embodiments, or any combination of any other of the embodiments. Furthermore, equivalents and modifications not described above may also be employed without departing from the scope of the invention, which is defined in the accompanying claims.

The invention claimed is:

1. A method of buffering, at a client device, a segment of an encoded data stream, the segment being arranged in hierarchical layers comprising a plurality of segment units including a base layer segment and one or more enhancement layer segments, the base layer segment being decodable to a base level of reproduction quality, and the one or more enhancement layer segments, together with the base layer segment, being decodable to enhanced levels of reproduction quality, the method comprising the steps of:

receiving at the client device the segment of the encoded data stream within a prescribed time period, the client device having derived and having pre-determined the prescribed time period for buffering the received segment, the prescribed time period having been derived at least in part using a bandwidth of a communication link from which the segment is received, a playback time of the segment, and an amount of data in the segment, and the encoded data stream having been created using the prescribed time period;

buffering the entire base layer segment, all of a portion of a first enhancement layer segment that was received during the prescribed time period, and all of any additional enhancement layer segment portions that was received during the prescribed time period;

transferring to a decoder for decoding the base layer segment, the all of a portion of the first enhancement layer segment that was received during the prescribed time period, and the all of the any additional enhancement layer segment portions that was received during the prescribed time period.

2. The method of claim 1, wherein the segment comprises a plurality of segment units of data, each segment unit of data having a corresponding base layer unit and a corresponding enhancement layer unit.

3. The method of claim 2, wherein each base layer unit is decodable independently from other base layer units.

4. The method of claim 3, wherein each enhancement layer unit is decodable with its corresponding base layer unit independently from other base layer units or other enhancement layer units.

5. The method of claim 1, wherein the segment comprises data representing a plurality of frames of video data, and each frame is represented by a base layer unit and an enhancement layer unit.

6. The method of claim 1, wherein receiving the segment comprises requesting each of the base layer segment and the enhancement layer segment separately on a layer-by-layer basis.

7. The method of claim 6, wherein in the step of requesting the segment comprises requesting firstly the base layer segment, followed by the enhancement layer segment.

8. The method of claim 1, wherein the step of streaming the encoded data stream comprises requesting firstly the segment of the encoded data stream, followed by requesting a second segment of the encoded data stream.

9. The method of claim 1, wherein the prescribed time is less than the playback time of the segment.

10. The method of claim 1, wherein the reproduction quality is or is related to one or more of the following: resolution; compression; samples per second; or frames per second.

11. The method of claim 1 wherein the step of sending the buffered base layer segment occurs following, or at the end of, the prescribed time period.

12. An apparatus for receiving and decoding an encoded data stream, the apparatus comprising:

a processor configured to control streaming of an encoded data stream;

a communications port configured to communicate with a source of the encoded data stream;

a buffer configured to buffer segments of the encoded data stream; and a codec arranged to decode the buffered segments of the encoded data stream;

wherein each segment of the encoded data stream is arranged in hierarchical layers comprising a plurality of segment units including a base layer segment and one or more enhancement layer segments, the base layer segment being decodable to a base level of reproduction quality, and the one or more enhancement layer segments, together with the base layer segment, being decodable to enhanced levels of reproduction quality;
the processor being configured to cause the apparatus to:
receive the encoded data stream through the communications port for a prescribed time period, the apparatus having derived and having pre-determined the prescribed time period for buffering the received data stream, the prescribed time period having been derived at least in part using a bandwidth of a communication link from which the data stream is received, a playback time of the data stream, and an amount of data in the data stream, and the encoded data stream having been created using the prescribed time period;
buffer the entire base layer segment, all of a portion of a first enhancement layer segment that was received during the prescribed time period, and all of any additional enhancement layer segment portions that was received during the prescribed time period;
transfer to a decoder for decoding the entire buffered base layer segment, the all of a portion of the first enhancement layer segment that was received during the prescribed time period, and the all of the any additional enhancement layer segment portions that was received during in-the prescribed time period.

13. The apparatus of claim 12 wherein the processor is further configured to cause the buffered base layer segment and what is received of the enhancement layer segment to be sent following, or at the end of, the prescribed time period.

14. A computer-readable hardware storage device having instructions recorded thereon which, when executed, causes a computer to perform a method of buffering, at a client device, a segment of an encoded data stream, the segment being arranged in hierarchical layers comprising a plurality of segment units including a base layer segment and one or more enhancement layer segments, the base layer segment being decodable to a base level of reproduction quality, and the one or more enhancement layer segments, together with the base layer segment, being decodable to enhanced levels of reproduction quality, the method comprising the steps of:
receiving at the client device the segment of the encoded data stream within a prescribed time period, the client device having derived and having pre-determined the prescribed time period for buffering the received segment, the prescribed time period having been derived at least in part using a bandwidth of a communication link from which the segment is received, a playback time of the segment, and an amount of data in the segment, and the encoded data stream having been created using the prescribed time period;
buffering the entire base layer segment, all of a portion of a first enhancement layer segment that was received during the prescribed time period, and all of any additional enhancement layer segment portions that was received during the prescribed time period;
transferring to a decoder for decoding the entire base layer segment, the all of a portion of the first enhancement layer segment that was received during the prescribed time period, and the all of the any additional enhancement layer segment portions that was received during the prescribed time period.

* * * * *